Patented June 11, 1940

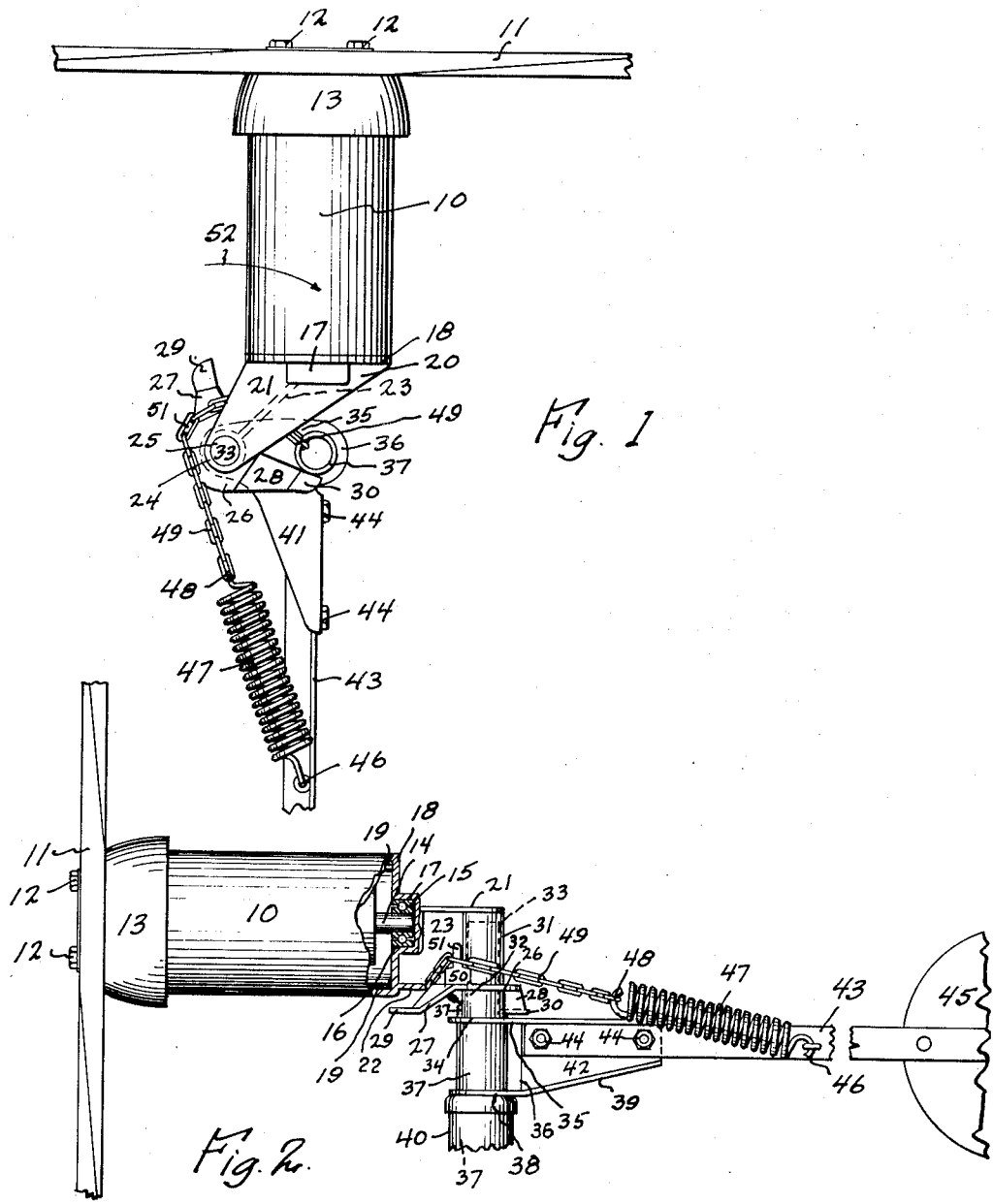

2,204,462

UNITED STATES PATENT OFFICE 2,204,462

MOUNTING FOR WIND CHARGING UNITS

John R. Albers, Sioux City, Iowa, assignor to Wincharger Corporation, Sioux City, Iowa, a corporation of Minnesota Application January 9, 1939, Serial No. 249,996

6 Claims. (Cl. 290—55)

My invention relates to a wind charging unit mounting.

An object of my invention is to provide a mounting which is associated with the rear end of a wind driven generator and which includes features for eccentrically mounting the same.

A further object of my invention is to provide a mounting unit which is located off center of the normal tail vane and generator structure and which includes features for allowing eccentric pivoting of a generator with respect to the tail vane.

A further object of my invention is to provide such a mounting which will allow the attachment of suitable governing device thereto and which will include limiting members which will limit the pivotal action of the generator.

A further object of my invention is to provide the above objects in a simple construction.

With these and other objects in view, my invention consists in the construction, arrangement and combination of the various parts of my device, whereby the objects contemplated are attained, as hereinafter more fully set forth, pointed out in my claims, and illustrated in the accompanying drawing, in which:

Figure 1 is a plan view of a portion of the wind charging unit showing the mounting attached to the generator with a portion of the tail vane structure pivotally attached thereto, and Figure 2 is a side elevation of Figure 1.

I have used the character 10 to designate an electric generator which is driven by means of the wind blade 11 which is attached at 12 to the enclosing member 13. A shaft 14 (see Figure 2) is attached forwardly to the blade 11 and extends rearwardly where it is received within the suitable bearings 15. The bearings 15 are received within a cavity 16 located in the rear cylindrical protuberance 17 which is integrally formed with a rear plate 18 which is attached to the generator frame by means of suitable lengthened bolts 19.

Merging from the rear plate 18 and the member 17 is the member 20 which includes the upper and lower ribs 21 and 22 which are horizontally positioned and a further medial rib 23 which is vertically positioned and merges with the aforesaid ribs. The member 20 extends substantially to one side of the center line of the generator as shown to the extremity 24 which includes a vertical cylindrical cavity 25. Extending from the lower rib 22 is an arcuate portion 26 to which is attached integrally the arms 27 and 28 which include the end stop members 29 and 30.

Integrally formed therewith and extending from the portion 26 is the upper cylindrical portion 31 and the lower portion 32 which are merely the surrounding cylindrical sides of the cylindrical opening 25. A cylindrical pin 33 is received within the opening 25 and is attached at 34 (see Figure 2) to a further member 35 which extends laterally to the portion 36 which is attached to the cylindrical member 37 which member 37 extends a slight distance above the portion 36 (see Figure 2). The member 37 also extends between the member 36 and a lower rib member 38 which extends into the further rib 39. The member 37 extends downwardly and is pivotally received within a further cylindrical pipe member 40 and is freely pivoted therein.

The member 36 extends into a rear portion 41 having the vertical walls 42 merging with the rib 39 to which is bolted the angle iron 43 at 44. The angle iron 43 extends into the tail vane 45. Attached at 46 to the angle iron 43 is the helical tension spring 47 which is attached at 48 to the chain 49. Extending upwardly from the member 26 is the flange 50 which terminates in the vertically projecting lip 51 which is received within one of the links of the chain 49. The same then continues about and beneath the member 21 and extends downwardly through the cylindrical member 37 and terminates near the ground level to allow a suitable control at this point.

By virtue of the foregoing construction the generator will pivot about the pin 33 in the direction of the arrow 52. The action of the blades 11 causes this pivotal action which is in a direction against the tension of the spring 47 so that in stronger winds of the generator, by pivoting, will pivot away from the direct path of the wind itself thereby decreasing the effective wind area and slowing the structure. The members 43 and 45 insure that the tail vane is kept in the direction of the wind so that the two provide a direct governing action.

The members 29 and 30 provide stop limits for this pivotal action, the member 30 preventing the generator from being carried off the tail vane center in normal operation and the stop member 29 limiting the movement of the generator to a position directly at right angles with the tail vane. The chain 49 which continues downwardly through the pipe 37 and thence to the ground level provides a means for locking the generator at right angles to the tail vane and thereby carrying the pitch of the blades out of the wind and stopping the unit.

It will be seen that the rear plate structure in combination with the eccentric mounting with respect to the tail vane provides a unitary and compact arrangement which includes the various features already mentioned. It will be seen further that the eccentric pivoting of the generator with respect to the tail vane provides for certain governing features and the like which are essential in the operation of the present device.

Some changes may be made in the construction and arrangement of the parts of my invention without departing from the real spirit and purpose of my invention, and it is my intention to cover by my claims any modified forms of structure or use of mechanical equivalents, which may be reasonably included within their scope.

I claim as my invention:

1. A generator turn table mounting comprising a pivoting member, said pivoting member having a forward circular horizontal cavity adapted to receive a generator shaft bearing, said pivoting member being pivoted off center with respect to the longitudinal axis of said generator.

2. A generator turn table mounting comprising a pivoting member, said pivoting member having a forward circular horizontal cavity adapted to receive a generator shaft bearing, said pivoting member being pivoted off center with respect to the longitudinal axis of said generator, means for attaching a tail vane structure to said mounting.

3. A generator turn table mounting comprising a pivoting member, said pivoting member having a forward circular horizontal cavity adapted to receive a generator shaft bearing, said pivoting member being pivoted off center with respect to the longitudinal axis of said generator, means for attaching a tail vane structure to said mounting, a forward pivotal member to which said tail vane structure is attached being pivoted upon the axial line of said generator.

4. In combination with a generator, a pivotal turn table mounting including a portion thereof adapted to be attached to a generator frame and to provide a rear plate therefor, said turn table being pivoted off center of the longitudinal axial line of the generator.

5. A generator turn table mounting comprising a generator pivoting member including a member extending off the axial line of the generator, a further tail vane pivoting member to which said generator pivoting member is pivoted, said tail vane pivoting member being positioned directly laterally of the pivoting point of said generator pivoting member and on the axial line of said generator.

6. A generator turn table mounting comprising a generator pivoting member including a member extending off the axial line of the generator, a further tail vane pivoting member to which said generator pivoting member is pivoted, said tail vane pivoting member being positioned directly laterally of the pivoting point of said generator pivoting member and on the axial line of said generator, said generator pivotal member including limiting members attached thereto to limit pivotal movement of said generator from a position in line with said tail vane structure to a position at right angles thereto.

JOHN R. ALBERS.